J. S. Sarage,
Derrick
No 23. A. I. Patented Sept 13, 1839.
BEST AVAILABLE COPY
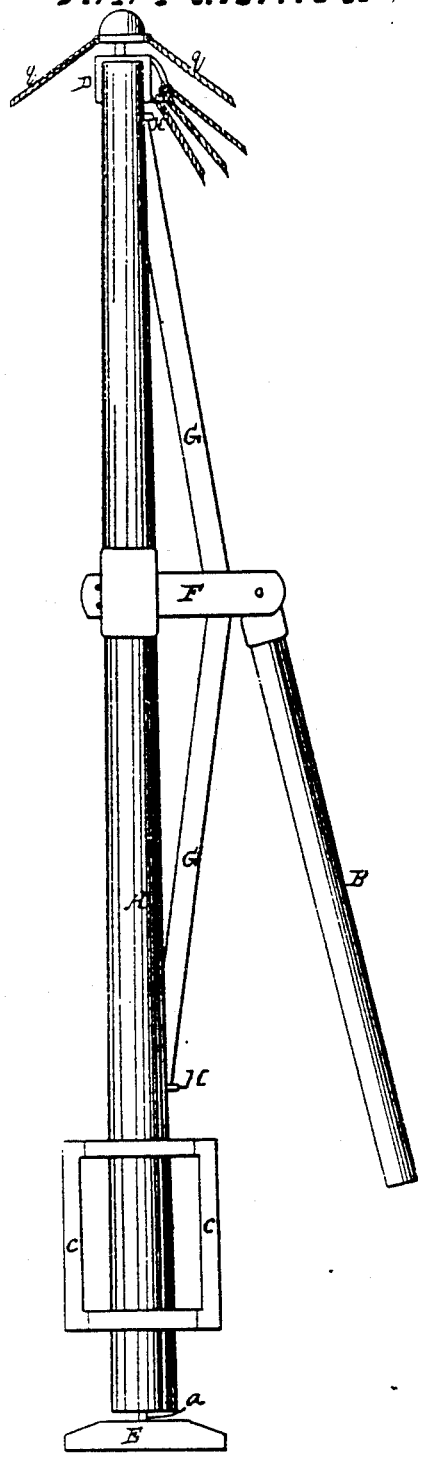
N. PETERS, PHOTO-LITHOGRAPHER, WASHINGTON, D. C.